(12) United States Patent
Kato

(10) Patent No.: US 6,276,716 B1
(45) Date of Patent: Aug. 21, 2001

(54) AIR BAG SYSTEM FOR MOTOR VEHICLE, AND METHOD OF CONTROLLING THE SAME

(75) Inventor: Toyoaki Kato, Aichi (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/209,742

(22) Filed: Dec. 10, 1998

(30) Foreign Application Priority Data

Dec. 10, 1997 (JP) .................................................... 9-361926

(51) Int. Cl.[7] .................................................. B60R 21/32
(52) U.S. Cl. ........................ 280/735; 280/729; 280/743.2
(58) Field of Search ................... 280/729, 743.1, 280/743.2, 735, 736

(56) References Cited

U.S. PATENT DOCUMENTS

| | | | |
|---|---|---|---|
| 3,642,303 | * | 2/1972 | Irish et al. .......................... 280/730.1 |
| 3,767,225 | * | 10/1973 | Mazelsky ............................... 280/729 |
| 3,768,830 | * | 10/1973 | Hass ..................................... 280/729 |
| 4,043,572 | * | 8/1977 | Hattori et al. .......................... 280/738 |
| 5,174,600 | * | 12/1992 | Jahn et al. .............................. 280/733 |
| 5,282,646 | * | 2/1994 | Melvin et al. .......................... 280/729 |
| 5,310,214 | * | 5/1994 | Cuevas ................................... 280/729 |
| 5,338,063 | * | 8/1994 | Takeuchi et al. ...................... 280/735 |
| 5,400,867 | * | 3/1995 | Muller et al. .......................... 180/268 |
| 5,411,289 | * | 5/1995 | Smith et al. ............................ 280/735 |
| 5,520,413 | * | 5/1996 | Mossi et al. ............................ 280/729 |
| 5,603,526 | * | 2/1997 | Buchanan .............................. 280/739 |
| 5,613,702 | * | 3/1997 | Goetz ..................................... 280/735 |
| 5,707,078 | * | 1/1998 | Swanberg et al. ..................... 280/739 |
| 5,791,685 | * | 8/1998 | Lachat et al. ....................... 280/743.1 |
| 5,851,025 | * | 12/1998 | Gamboa ................................. 280/735 |
| 5,853,191 | * | 12/1998 | Lachat ................................. 280/730.2 |
| 5,871,231 | * | 2/1999 | Richards et al. ...................... 280/735 |
| 5,906,391 | * | 5/1999 | Weir et al. ............................. 280/729 |
| 6,020,812 | * | 2/2000 | Thompson et al. ..................... 7/10.1 |

\* cited by examiner

Primary Examiner—Paul N. Dickson
Assistant Examiner—Deanna Draper
(74) Attorney, Agent, or Firm—Rossi & Associates

(57) ABSTRACT

An air bag is divided by a partition wall into an upper section and a lower section. When the vehicle occupant is wearing a seat belt, gas is supplied from an inflator only to the upper section, so that the air bag mainly restrains the head of the vehicle while applying a reduced restraining force of the chest of the occupant. When the vehicle occupant is not wearing the seat belt, gas is initially supplied from the inflator to the lower section, until the upper section and the lower section are brought into communication with each other as a result of expansion of the lower section, and then the gas is also led to the upper section, so that the air bag accurately and effectively restrains the head and chest of the vehicle occupant.

24 Claims, 4 Drawing Sheets

AIR BAG SYSTEM FOR MOTOR VEHICLE, AND METHOD OF CONTROLLING THE SAME

BACKGROUND OF THE INVENTION

The present invention relates to an air bag system that restrains a vehicle occupant upon a collision of a motor vehicle, for example, so as to protect the vehicle occupant from an impact applied to the vehicle body, and in particular to such an air bag system that is able to restrain the vehicle occupant with high efficiency, and a method of controlling the air bag system.

An air bag system for a motor vehicle as disclosed in U.S. Pat. No. 5,308,113 has been known which includes an inflatable bag, and an inflation-controlling member that is coupled to the bag and serves to control inflation of the bag.

More specifically, a releasable connection of the inflation-controlling member remains intact during initial stages of the inflation process of the bag, so that the inflation-controlling member extends to its initial length, thereby to restrict inflation of the bag. The releasable connection releases during intermediate stages of the inflation process of the bag, so that the inflation-controlling member extends to its intermediate length, and the bag assumes an intermediate shape. A stretchable section of the inflation-controlling member then stretches during the final stages of the inflation process, so that the inflation-controlling member extends to its final length, and the bag assumes a final shape.

With this arrangement, the air bag is able to protect a vehicle occupant who is seated at a location other than a nominal seated position, and also permits the bag and the vehicle occupant to softly or flexibly contact with each other when he/she is seated at the nominal position.

In the known air bag system, however, the vehicle occupant who is seated at the nominal position is restricted and protected by the bag that has inflated to its full size in the final stages, and therefore the maximum amount of gas is always supplied to the bag upon its inflation. Where the vehicle occupant is wearing a seat belt, therefore, the bag that has inflated to its full size may undesirably apply an excessively large restraining force to the chest of the vehicle occupant.

SUMMARY OF THE INVENTION

It is therefore an object of the present invention to provide an air bag system wherein the capability of an air bag to restrain the vehicle occupant is changed depending upon whether the occupant is wearing a seat belt or not, so that the air bag can restrain the vehicle occupant with improved efficiency, to thus protect the occupant from an impact upon a collision of the vehicle. It is another object of the invention to provide a method of controlling such an air bag system.

To accomplish the above object, the present invention provides an air bag system for a motor vehicle, comprising: an inflator that is installed on the motor vehicle; a control device that causes the inflator to emit gas when an impact that is greater than a predetermined value is applied to a vehicle body of the motor vehicle; an air bag that deploys to fill space between a vehicle occupant and the inflator when the gas emitted from the inflator is supplied to the air bag, the air bag having a plurality of sections that are formed independently of each other; and a sensor that detects whether the vehicle occupant wears a seat belt. In this air bag system, the control device changes an amount of the gas supplied from the inflator to each of the plurality of sections, depending upon a result of detection of the sensor. With the air bag system thus constructed, the air bag is able to vary its capability to restrain the vehicle occupant, depending upon whether the vehicle occupant is using the seat belt or not.

In one preferred form of the invention, an inner space of the air bag is divided by a partition wall into an upper section and a lower section. In this case, the control device controls the inflator so as to supply the gas to the upper section and the lower section when the result of detection of the sensor indicates that the vehicle occupant fails to wear the seat belt. With this arrangement, the upper and lower sections of the air bag are able to accurately and effectively restrain the head and chest of the vehicle occupant who is not using the seat belt.

In the above form of the invention, the control device may control the inflator so as to reduce an amount of gas supplied to the lower section when the result of detection of the sensor indicates that the vehicle occupant wears the seat belt, than an amount of gas supplied to the lower section when the result of detection of the sensor indicates that the vehicle occupant fails to wear the seat belt. With this arrangement, a reduced restraining force is applied to the chest of the vehicle occupant who is wearing the seat belt, which is less required to be restrained, and therefore the air bag system is able to restrain the vehicle occupant with improved efficiency.

BRIEF DESCRIPTION OF THE DRAWINGS

The invention will be described in greater detail with reference to preferred embodiments thereof and the accompanying drawings, wherein.

DETAILED DESCRIPTION OF THE PREFERRED EMBODIMENTS

Figure 1:
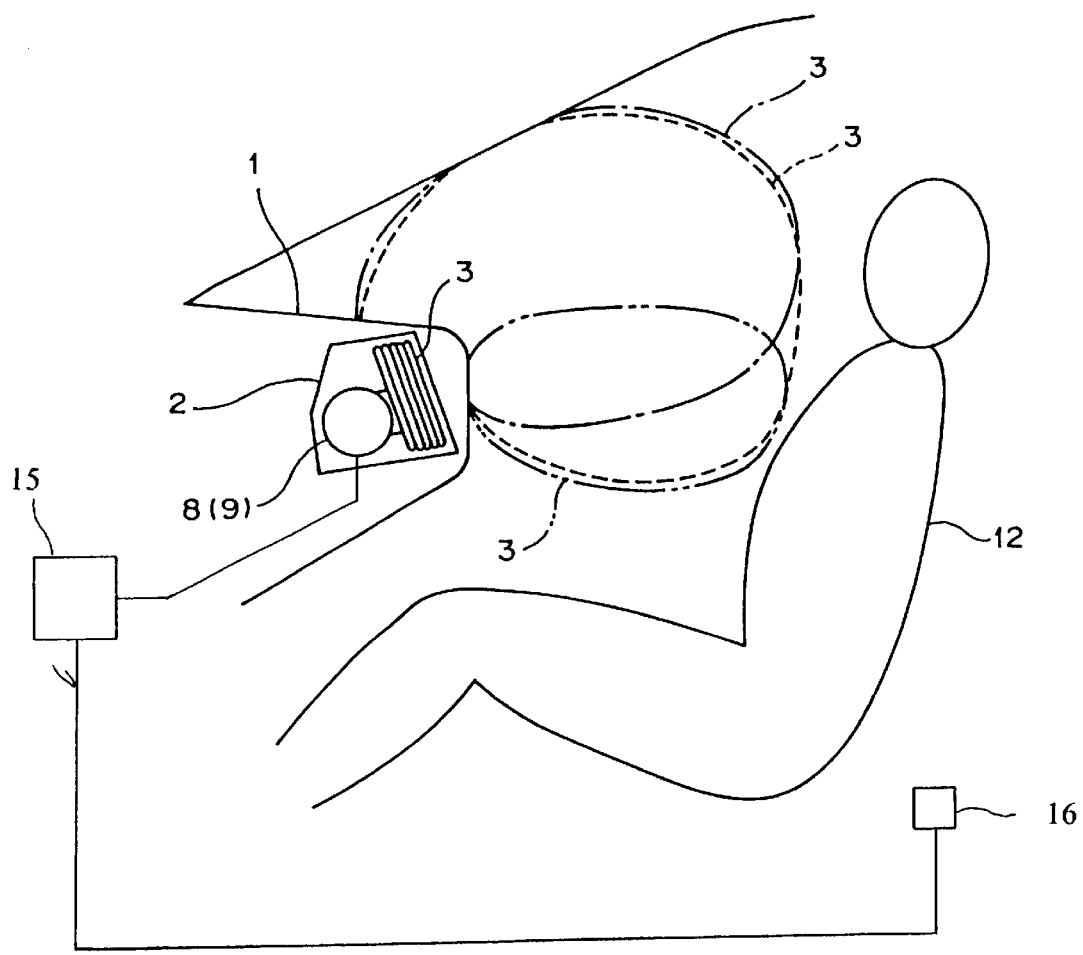
FIG. 1 is a vertical cross-sectional view of an air bag system according to one embodiment of the present invention.
Figure 2:
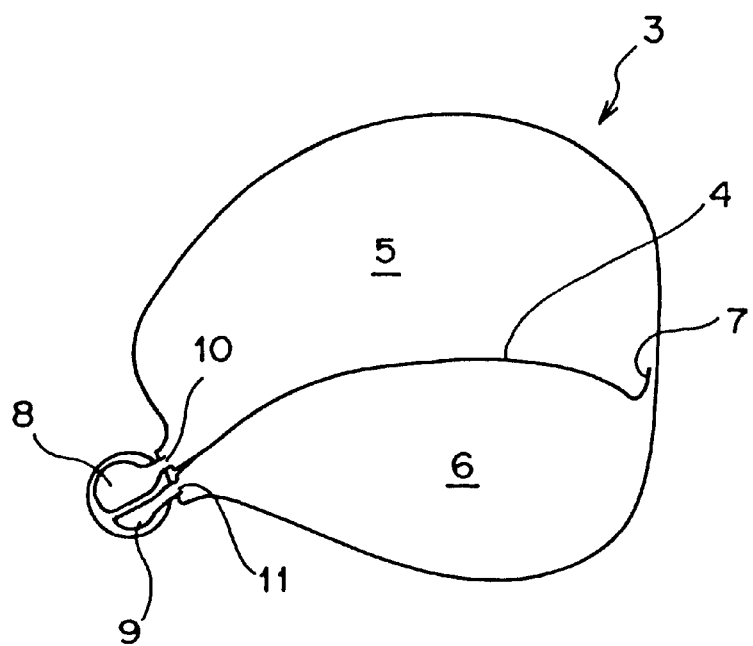
FIG. 2 is a cross-sectional view of a principal part of the air bag system of the embodiment of FIG. 1.

Referring first to FIG. 1, an air bag module 2 is housed in a vehicle instrument panel 1 on the side of the passenger seat. The air bag module 2 includes an air bag 3 that is normally in a folded condition, and inflators 8, 9 as described later. When the air bag 3 folded in the air bag module 2 inflates or deploys, as shown in FIG. 2, the inner space of the air bag 3 is divided by a cloth partition wall extending toward the passenger 12, into an upper section 5 having a relatively large capacity, and a lower section 6 having a relatively small capacity.

In the present embodiment, the partition wall 4 is sewn to the inner surface of the air bag 3. More specifically, two side edges of the partition wall (on the opposite sides as viewed in the vehicle width direction in FIG. 2) are firmly sewn to the inner surface of the air bag 3, whereas an end portion 7 of the partition wall 4 that faces the passenger seat is bent upwards, and relatively weakly sewn to the inner surface of the air bag 3.

The binding strength between the passenger-side end portion 7 of the partition wall 4 and the air bag 3 may be made lower than that between the two sides edges and the air bag 3, by using relatively weak or thin thread when sewing the end portion 7 to the air bag 3, or increasing the sewing pitch or interval at the end portion 7, for example.

With this arrangement, when the pressure within the lower section 6 of the air bag 3 becomes higher than the pressure within the upper section 5 by a predetermined value or greater, the end portion 7 is relatively easily separated or disengaged from the inner surface of the air bag 3, to thus provide a uniform pressure in the air bag 3.

The air bag module 2 is provided with upper inflator 8 and lower inflator 9 that are controlled by a control device 15. A gas outlet 10 of the upper inflator 8 is held in communication with the upper section 5 of the air bag 3, and a gas outlet 11 of the lower inflator 9 is held in communication with the lower section 6 of the air bag 3. The air bag system is provided with a seat belt sensor 16 that detects whether the passenger 12 sitting on the passenger seat is wearing a seat belt or not.

Figure 4:
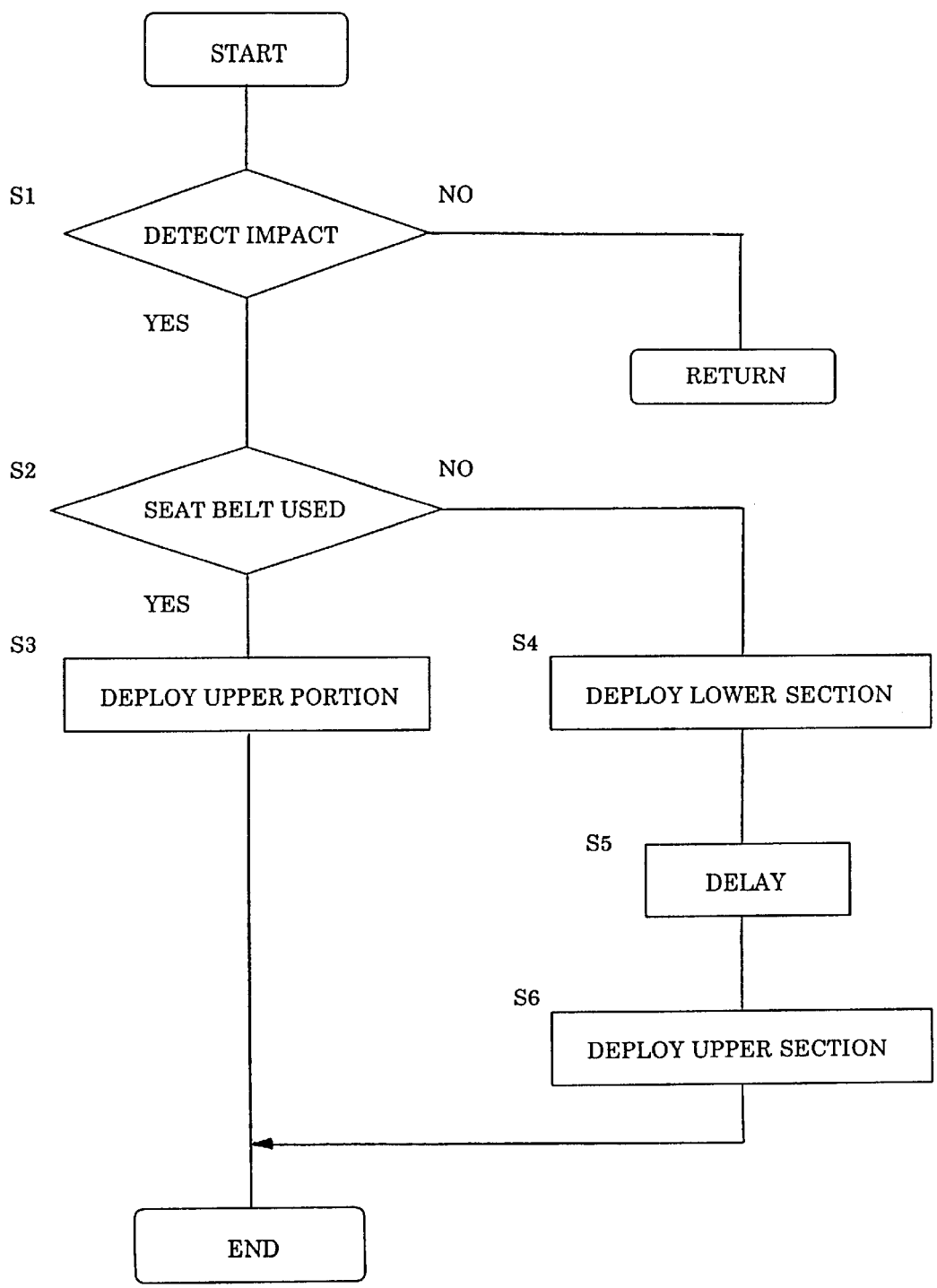
FIG. 4 is a flow chart of a control routine according to which the air bag system of the embodiment of FIG. 1 controls inflation of an air bag.

Referring next to the flow chart of FIG. 4, the operation of the air bag system will be explained.

If the control device 15 determines that an impact force that is equal to or greater than a predetermined value is applied to the vehicle body in step S1, step S2 is executed to determine whether the passenger 12 is using the seat belt, based on the output of the seat belt sensor.

If an affirmative decision (YES) is obtained in step S2, namely, when the passenger 12 is wearing the seat belt, only the upper inflator 8 is caused to operate, and the gas emitted from the upper inflator 8 is led to the upper section 5 of the air bag 3 having a relatively large capacity, through the upper gas outlet 10, so as to deploy the upper section 5 (step S3).

At this time, the lower inflator 9 does not operate, and therefore the end portion 7 of the partition wall 4 is pressed against the inner surface of the air bag 3 due to the gas pressure in the upper section 5, and thus kept weakly engaged with the air bag 3. Accordingly, the partition wall 4 keeps separating the upper section 5 from the lower section 6 to inhibit communication therebetween, and the air bag 3 expands obliquely and upwardly, to the size corresponding to that of the upper section 5. Thus, the air bag 3 that deploys from inside the instrument panel 1 toward the passenger 12 mainly serves to relatively softly restrains the head of the passenger 12, to thus protect the passenger 12 from the impact.

Since it is less necessary to restrain the chest of the passenger 12 while he/she is using the seat belt, no gas is supplied from the lower inflator 9 to the lower section 6 of the air bag 3. Namely, while the passenger 12 is using the seat belt, the amount of gas supplied to the air bag 3 is controlled not to be greater than needed, thus enabling the air bag to restrain the passenger 12 with high efficiency.

When a negative decision (NO) is obtained in step S2, namely, where the passenger 12 is not using the seat belt, the control flow goes to step S4 in which the lower inflator 9 is initially caused to operate, and the gas emitted from the lower inflator 9 is led to the lower section 6 of the air bag 3 having a relatively small capacity, through the lower gas outlet 11 (step S4). As a result, the air bag 3 inflates or deploys backwards to the size corresponding to that of the lower section 6, as indicated by a two-dot chain line in FIG. 1.

Since the capacity or volume of the lower section 5 is set smaller than that of the upper section 5, the pressure in the lower section 6 increases rapidly upon the start of the operation of the lower inflator 9, and the end portion 7 of the partition wall 4 is separated or disengaged from the inner surface of the air bag 3 due to the increased pressure, thereby allowing the upper section 5 and lower section 6 to communicate with each other. In this manner, the pressure in the lower section 6 is prevented from being excessively increased.

After a predetermined time elapses in step S5, the upper inflator 8 starts operating, and gas emitted from the upper inflator 8 is led to the upper section 5 of the air bag 3 having a relatively large capacity, through the upper gas outlet 10, so as to deploy the upper portion 5 in step S6.

Since the upper section 5 and the lower section 6 are in communication with each other at this time, the gas emitted from the lower inflator 9 and the gas emitted from the upper inflator 8 fill the entire space in the air bag 3, so as to provide a uniform pressure in the air bag 3. Thus, the air bag 3 deploys widely from the inside of the instrument panel 1 toward the passenger 12, with the gas filling the entire space of the upper portion 5 and the lower portion 6. Consequently, the air bag 3 restrains the head and chest of the passenger 12 with a suitable degree of elasticity, thereby to surely protect the passenger 12 from the impact.

In the air bag system according to the present invention as described above, the amount of gas supplied from the inflators to a plurality of sections in the air bag is changed depending upon the result of detection of the seat belt sensor. Thus, the passenger restraining capability can be varied depending upon whether the passenger is using the seat belt or not.

In the air bag system of the present embodiment, the inner space of the air bag is divided by the partition wall into the upper section and the lower section, and the gas is supplied to both the upper section and the lower section when the seat belt sensor detects that the passenger is not wearing the seat belt. Thus, the upper and lower sections of the air bag are able to accurately and effectively restrain the head and chest of the passenger who is not wearing the seat belt.

Furthermore, the amount of gas supplied to the lower section of the air bag is reduced when the seat belt sensor detects that the passenger is using the seat belt. As a result, a reduced restraining force is applied to the chest of the passenger who is wearing the seat belt, which is less required to be restrained, and thus the air bag system can restrain the passenger with improved efficiency.

While the end portion 7 of the partition wall 4 is tentatively or weakly sewn to the inner surface of the air bag 3 in the illustrated embodiment, a Velcro™ fastener, or the like, may be used to engage the end portion 7 with the air bag 3. In this case, when the gas is supplied only to the upper section 5 of the air bag 3, the binding or fastening force of the Velcro fastener needs to increase with an increase in the gas pressure in the upper section 5. When the pressure in the lower section 6 becomes higher than that in the upper section by a predetermined value or larger, on the other hand, the engagement of the end portion 7 with the air bag 3 by means of the Velcro fastener should be released, so that the upper and lower sections 5, 6 are brought into communication with each other.

Figure 3:
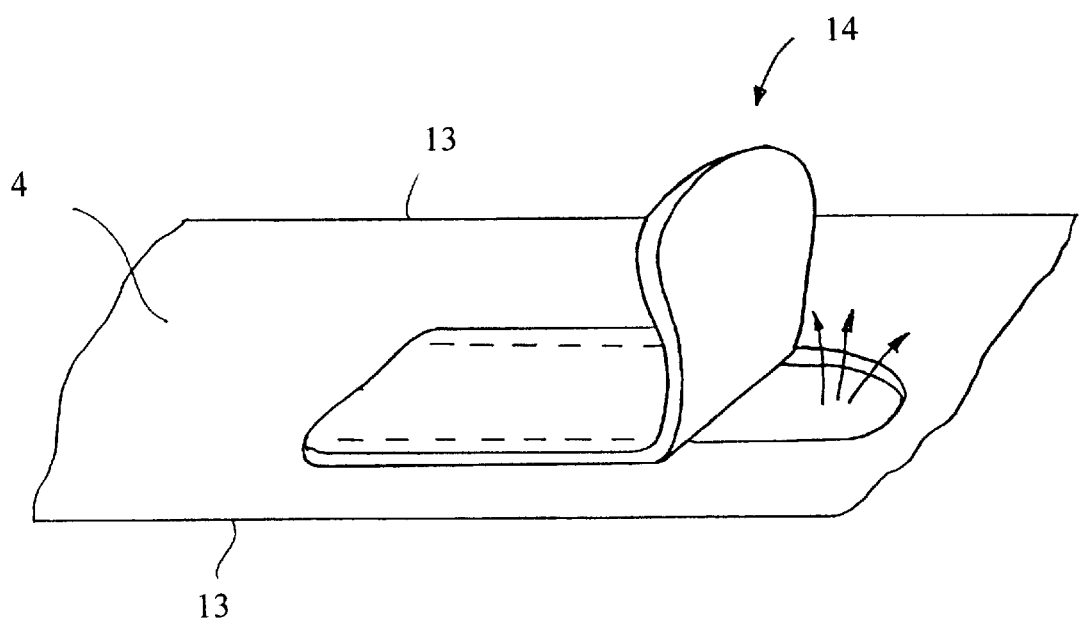
FIG. 3 is an enlarged view of a principal part of an air bag system according to another embodiment of the present invention.

Instead of using tentative sewing or Velcro fastener as described above, a valve 14 that restricts gas flow from the upper section 5 into the lower section 6 may be provided on the partition wall 4, as shown in FIG. 3, so that the upper section 5 and the lower section 6 communicate with each other when the pressure in the lower section 6 becomes higher than that in the upper section 5 by a predetermined value or greater.

In the illustrated embodiment, the lower inflator 9 is totally inhibited from operating when the passenger 12 is using the seat belt. It is, however, possible to allow the lower inflator 9 to emit a small amount of gas provided that the gas flowing into the lower section 6 does not result in an excessively large restraining force applied to the chest of the passenger 12.

While the air bag 3 is divided into two sections, namely, upper section 5 and lower section 6, in the illustrated embodiment, the air bag 3 may be divided into three or more sections, and the amount of gas supplied to each section may be controlled in response to a signal indicative of the result of detection of the seat belt sensor.

While the air bag system is installed in front of the passenger seat in the illustrated embodiment, the present invention is equally applicable to air bag systems installed on the side of the driver's seat or rear seat.

What is claimed is:

1. An air bag system for a motor vehicle, comprising:
   an inflator that is installed on the vehicle;
   a control device that causes said inflator to emit gas when an impact that is greater than a predetermined level is applied to a vehicle body of the motor vehicle;
   an air bag that deploys to fill space between a vehicle occupant and said inflator when the gas emitted from the inflator is supplied to the air bag, said air bag having a plurality of sections that are formed independently of each other including at least a first air bag section and a second air bag section; and
   a sensor that detects whether the vehicle occupant wears a seat belt;
   wherein said control device changes an amount of the gas supplied from said inflator to each of a plurality of sections;
   by deploying the first air bag section when the sensor detects seat belt use;
   and by deploying the second air bag section and then deploying the first air bag section after a predetermined time has elapsed when the sensor detects no seat belt use.

2. An air bag system according to claim 1,
   wherein the first air bag section is an upper section and the second air bag section is a lower section;
   wherein an inner space of said air bag is divided by a partition wall into the upper section and the lower section, and
   wherein said control device controls said inflator so as to supply the gas to the upper section and the lower section when the result of detection of said sensor indicates that the vehicle occupant fails to wear the seat belt.

3. An air bag system according to claim 2, wherein said control device controls said inflator to supply an amount of gas to said lower section when the result of detection of said sensor indicates that the vehicle occupant wears the seat belt, which is lesser than an amount of gas supplied to the lower section when the result of detection of the sensor indicates that the vehicle occupant fails to wear the seat belt.

4. An air bag system according to claim 2, wherein supply of the gas to said upper section is delayed with respect to supply of the gas to said lower section.

5. An air bag system according to claim 2, wherein said partition wall includes a relief portion that allows said upper section and said lower section to communicate with each other when a pressure in the lower section becomes higher than that in the upper section by at least a predetermined value.

6. An air bag system according to claim 5, wherein said relief portion is provided at an engaging portion between said partition wall and an inner surface of the air bag.

7. An air bag system according to claim 6, wherein said partition wall of the air bag that has deployed includes an extended end portion that faces the vehicle occupant, and two side edges that extend from said inflator to said end portion, said extended end portion of the partition wall and the inner surface of the air bag engaging with each other with a lower binding strength than that of engagement between said two side edges of the partition wall and the inner surface of the air bag.

8. An air bag system according to claim 7, wherein said partition wall is sewn to the inner surface of the air bag.

9. An air bag system according to claim 7, wherein said end portion of said partition wall on the side of the vehicle occupant is bent upwards, and tentatively attached to the inner surface of the air bag.

10. An air bag system according to claim 9, wherein said end portion of said partition wall on the side of the vehicle occupant is coupled to the inner surface of said air bag with a fastener.

11. An air bag system according to claim 5, wherein said relief portion comprises a valve that restricts gas flow from said upper section to said lower section.

12. An air bag system according to claim 2, wherein said inflator comprises an upper inflator that supplies gas to said upper section, and a lower inflator that supplies gas to said lower section.

13. An air bag system according to claim 12, wherein said control device operates said upper inflator when the result of detection of said sensor indicates that the vehicle occupant wears the seat belt.

14. An air bag system according to claim 13, wherein said control device operates said upper inflator and said lower inflator when the result of detection of said sensor indicates that the vehicle occupant fails to wear the seat belt.

15. An air bag system according to claim 14, wherein an operation of said upper inflator is delayed with respect to an operation of said lower inflator.

16. An air bag system according to claim 2, wherein said lower section has a smaller capacity than said upper section.

17. An air bag system according to claim 2, wherein said upper section of the air bag is located in front of a head of the vehicle occupant during deployment thereof.

18. An air bag system according to claim 2, wherein said lower section of the air bag is located in front of a chest of the vehicle occupant during deployment thereof.

19. A method of controlling an air bag system for a motor vehicle, said air bag system including an inflator capable of emitting gas, and an air bag that deploys to fill space between said inflator and a vehicle occupant when the gas emitted from the inflator is supplied to the air bag, said air bag having a plurality of sections that are formed independently of each other including at least a first air bag section and a second air bag section, said method comprising the steps of:
   detecting an impact force that is applied to a vehicle body of the motor vehicle, to determine whether the impact force is greater than a predetermined value;
   detecting whether the vehicle occupant wears a seat belt; and
   changing an amount of gas supplied from the inflator to each of said plurality of sections, to thereby deploy the first air bag section when it is detected that the vehicle occupant is wearing the seat belt, and to thereby deploy the second air bag section and then the first air bag section after a predetermined time has elapsed when it is detected that the vehicle occupant is not wearing a seat belt, when the impact force is greater than the predetermined value.

20. A method according to claim 19, wherein an inner space of the air bag is divided by a partition wall into an upper section and a lower section, and wherein said step of changing an amount of gas comprises a step of supplying the gas to said upper section and said lower section when it is determined that the vehicle occupant fails to wear the seat belt.

21. A method according to claim 20, wherein said partition wall includes a relief portion that allows said upper section and said lower section to communicate with each other when a pressure in the lower section becomes higher than a pressure in the upper section by at least a predetermined value, and wherein said step of supplying the gas to said upper section and said lower section comprises a step of delaying supply of the gas to the upper section with respect to supply of the gas to the lower section.

22. A method according to claim 20, wherein said step of changing an amount of gas comprises a step of reducing an amount of gas supplied to the lower section when it is determined that the vehicle occupant fails to wear the seat belt, than an amount of gas supplied to the lower section when it is determined that the vehicle occupant wears the seat belt.

23. An air bag system for a motor vehicle, comprising:

an inflator that is installed on the vehicle;

a control device that causes said inflator to emit gas when an impact that is greater than a predetermined level is applied to a vehicle body of the motor vehicle;

an air bag that deploys to fill space between a vehicle occupant and said inflator when the gas emitted from the inflator is supplied to the air bag, said air bag having a plurality of sections that are formed independently of each other and said air bag having a total inflated volume that is variable; and a sensor that detects whether the vehicle occupant wears a seat belt;

wherein said control device varies the total inflated volume of the air bag by changing an amount of the gas supplied from said inflator to each of plurality of sections depending upon a result of detection of said sensor.

24. A method of controlling an air bag system for a motor vehicle, said air bag system including an inflator capable of emitting gas, and an air bag that deploys to fill space between said inflator and a vehicle occupant when the gas emitted from the inflator is supplied to the air bag, said air bag having a plurality of sections, said method comprising the steps of:

detecting an impact force that is applied to a vehicle body of the motor vehicle and determining whether the impact force is greater than a predetermined value;

detecting whether the vehicle occupant wears a seat belt; and changing an amount of gas supplied from the inflator to each of said plurality of sections, depending upon whether the vehicle occupant wears the seat belt or not, when the impact force is greater than the predetermined value;

wherein the air bag has a total inflated volume that is variable; and wherein the total inflated volume of the air bag is varied by changing the amount of gas supplied from the inflator to each of the plurality of sections.

* * * * *